US009176263B2

(12) United States Patent
Zickler et al.

(10) Patent No.: US 9,176,263 B2
(45) Date of Patent: Nov. 3, 2015

(54) OPTICAL MICRO-SENSOR

(75) Inventors: Todd Zickler, Cambridge, MA (US); Sanjeev Jagannatha Koppal, Cambridge, MA (US); Geoffrey Louis Barrows, Washington, DC (US); Ioannis Gkioulekas, Cambridge, MA (US)

(73) Assignees: President and Fellows of Harvard College, Cambridge, MA (US); Centeye Incorporated, Washington, DC (US)

( * ) Notice: Subject to any disclaimer, the term of this patent is extended or adjusted under 35 U.S.C. 154(b) by 795 days.

(21) Appl. No.: 13/081,490

(22) Filed: Apr. 6, 2011

(65) Prior Publication Data
US 2012/0193517 A1 Aug. 2, 2012

Related U.S. Application Data

(60) Provisional application No. 61/321,481, filed on Apr. 6, 2010.

(51) Int. Cl.
G02B 5/00 (2006.01)
(52) U.S. Cl.
CPC .................................... G02B 5/008 (2013.01)
(58) Field of Classification Search
CPC ............ G02B 5/20; G02B 3/00; G02B 5/008; G01J 1/42
USPC ........ 250/208.2, 216, 226; 359/350, 642, 885
See application file for complete search history.

(56) References Cited

U.S. PATENT DOCUMENTS

| | | | | |
|---|---|---|---|---|
| 4,624,569 A | * | 11/1986 | Kwon | 356/521 |
| 4,969,043 A | * | 11/1990 | Pothier | 348/835 |
| 6,194,695 B1 | | 2/2001 | Barrows | |
| 7,102,824 B2 | * | 9/2006 | Clark et al. | 359/571 |
| 7,231,257 B2 | * | 6/2007 | McDermott et al. | 607/57 |
| 7,830,561 B2 | * | 11/2010 | Zomet et al. | 358/484 |
| 2003/0152274 A1 | * | 8/2003 | McGrew | 382/210 |
| 2011/0026141 A1 | | 2/2011 | Barrows | |

OTHER PUBLICATIONS

Avidan, "Support Vector Tracking," IEEE 2001, pp. I-184-I-191.
Black, et al, "Eigen Tracking: Robust Matching and Tracking of Articulated Objects Using a View-Based Representation," International Journal of Computer Vision 26(1), 1998, pp. 63-84.
Brajovic, et al, "Computational Sensor for Visual Tracking with Attention," IEEE Journal of Solid-State Circuits, vol. 33, No. 8, Aug. 1998, pp. 1199-1207.
Davenport, et al, "Signal Processing With Compressive Measurements," IEEE Journal of Selected Topics in Signal Processing, vol. 4, No. 2, Apr. 2010, pp. 445-460.
Elder, et al, "Local Scale Control for Edge Detection and Blur Estimation," IEEE Transactions on Pattern Analysis and Machine Intellegence, vol. 20, No. 7, Jul. 1998, pp. 699-716.
Farabet, et al, "An FPGA-Based Stream Processor for Embedded Real-Time Vision with Convolutional Networks," IEEE 12th International Conference on Computer Vision Workshops, ICCV Workshops, 2009, pp. 878-885.

(Continued)

Primary Examiner — Georgia Y Epps
Assistant Examiner — Don Williams
(74) Attorney, Agent, or Firm — Berkeley Law & Technology Group, LLP

(57) ABSTRACT

Briefly, embodiments of an optical micro-sensor are described.

37 Claims, 9 Drawing Sheets

(56) References Cited

OTHER PUBLICATIONS

Gyselinckx, et al, "Human++: Autonomous Wireless Sensors for Body Area Networks," IEEE, 2005, pp. 13-20.
Hiura, et al, "Krill-eye: Superposition Compound Eye for Wide-Angle Imaging via GRIN Lenses," IEEE 12th International Conference on Computer Vision Workshops, ICCV Workshops, 2009, pp. 2204-2211.
Jeong, et al, "Biologically Inspired Artificial Compound Eyes," Downloaded from www.sciencemag.org Science, vol. 312, Apr. 28, 2006, pp. 557-561.
Karpelson, et al, "Milligram-Scale High Voltage Power Electronics for Piezoelectric Microrobots," IEEE International Conference on Robotics and Automation, Kobe, Japan, May 12-17, 2009, pp. 2217-2224.
Ko, et al, "Curvilinear Electronics Formed Using Silicon Membrane Circuits and Elastomeric Transfer Elements," www.small-jounal.com, 2009, 5, No. 23, pp. 2703-2709.
Krishnan, et al, "Towards a True Spherical Camera," Downloaded from SPIE Digital Library, vol. 7240, pp. 724002-1-724002-13.
Kumar, "Attribute and Simile Classifiers for Face Verification," IEEE 12th International Conference on Computer Vision (ICCV), 2009, pp. 365-372.
Levin, et al, "Image and Depth from a Conventional Camera with a Coded Aperture," ACM Transactions on Graphics, vol. 26, No. 3 Article 70, Publication Date Jul. 2007, 70-1-70-9.
Tanida, et al, "Thin Observation Module by Bound Optics (TOMBO): Concept and Experimental Verification," Applied Optics, vol. 40, No. 11, Apr. 10, 2001, pp. 1806-1813.
Treibitz, et al, "Flat Refractive Geometry," IEEE, 2008, 8 Pages.
Uttam, et al, "Optically Mulitplexed Imaging with Superposition Space Tracking," Optics Express, vol. 17, No. 3, Feb. 2, 2009, pp. 1691-1713.
Viola, et al, "Robust Real-Time Face Detection," International Journal of Computer Vision 57(2), 2004, pp. 137-154.
Volkel, et al, "Miniaturized Imaging Systems," www.sciencedirect.com, Microelectronic Engineering 67-68, 2003, pp. 461-472.
Wilhelm, et al, "Evaluation of a Micro Fuel Cell as Applied to a Mobile Robot," IEEE, 2005, pp. 32-36.
Wolf, et al, "Smart Cameras as Embedded Systems," IEEE, 2002, pp. 48-53.
Zomet, et al, "Lensless Imaging with a Controllable Aperture," IEEE Computer Society Conference on Computer Vision and Pattern Recognition, 2006, 8 Pages.
Lecun, et al, "Gradient-Based Learning Applied to Document Recognition," IEEE, vol. 86, No. 11, Nov. 11, 1998, pp. 2278-2324.
Marr, et al, "Theory of Edge Detection," Downloaded from rspb.royalsocietypublishing.org on Apr. 6, 2011, pp. 187-217.
Mielenz, "On the Diffraction Limit for Lensless Imaging," Journal of Research of the National Institute of Standards and Technology, vol. 104, No. 5, Sep.-Oct. 1999, pp. 479-485.
Nayar, et al, "Programmable Imaging: Towards a Flexible Camera," International Journal of Computer Vision 70(1), 2006, pp. 7-22.
Steltz, et al, "Dynamometer Power Output Measurements of Miniature Piezoelectric Actuators," IEEE, 2009, pp. 1-10.
Swaminathan, et al, "Caustics of Catadioptric Cameras," IEEE, 2001, pp. 2-9.
O'Toole, et al, "Optical Computing for Fast Light Transport Analysis," SIGGRAPH Asia Conference, 2010, 11 pages.
Ng, "Fourier Slice Photography," Association of Computing Machinery, 2005, pp. 735-744.
Miyamoto, "Letters to the Editor (Fish Eyes Lens)," Journal of Optical Society of America, vol. 1964, pp. 1060-1061.
Veeraraghavan, et al, "Dappled Photography: Mask Enhanced Cameras for Heterodyned Light Fields and Coded Aperture Refocusing," SIGGRAPH Conference, 2007, 12 pages.
Chari, et al, "Multi-View Geometry of the Refractive Plane," British Machine Vision Conference, 2009, pp. 1-11.
Chandrakasan, et al, "Micropower Wireless Sensors," NSTI Conference, 2006, 4 pages.

\* cited by examiner

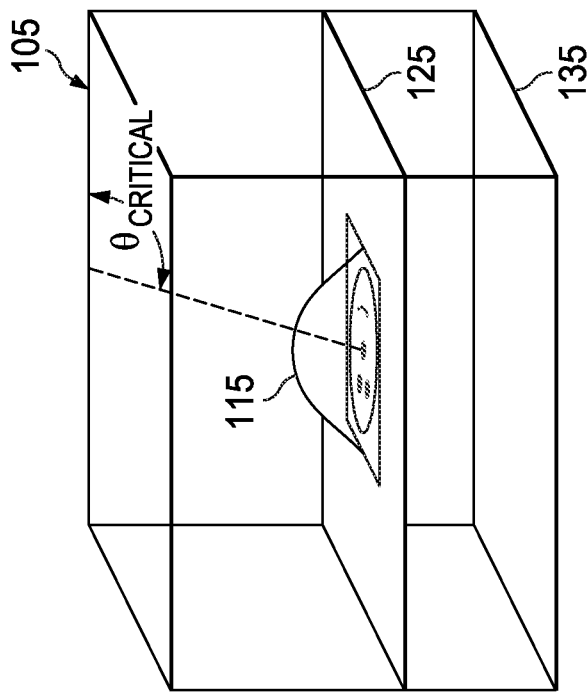
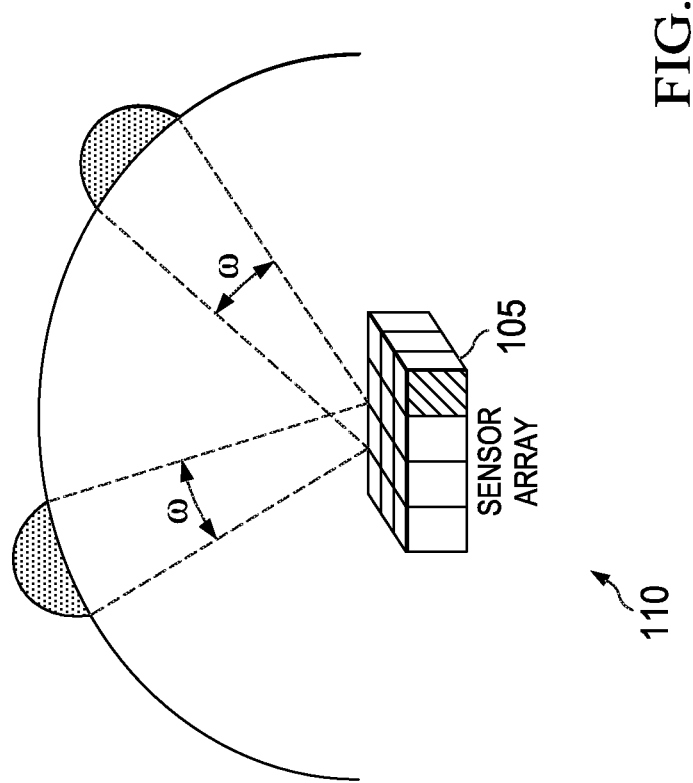
FIG. 1

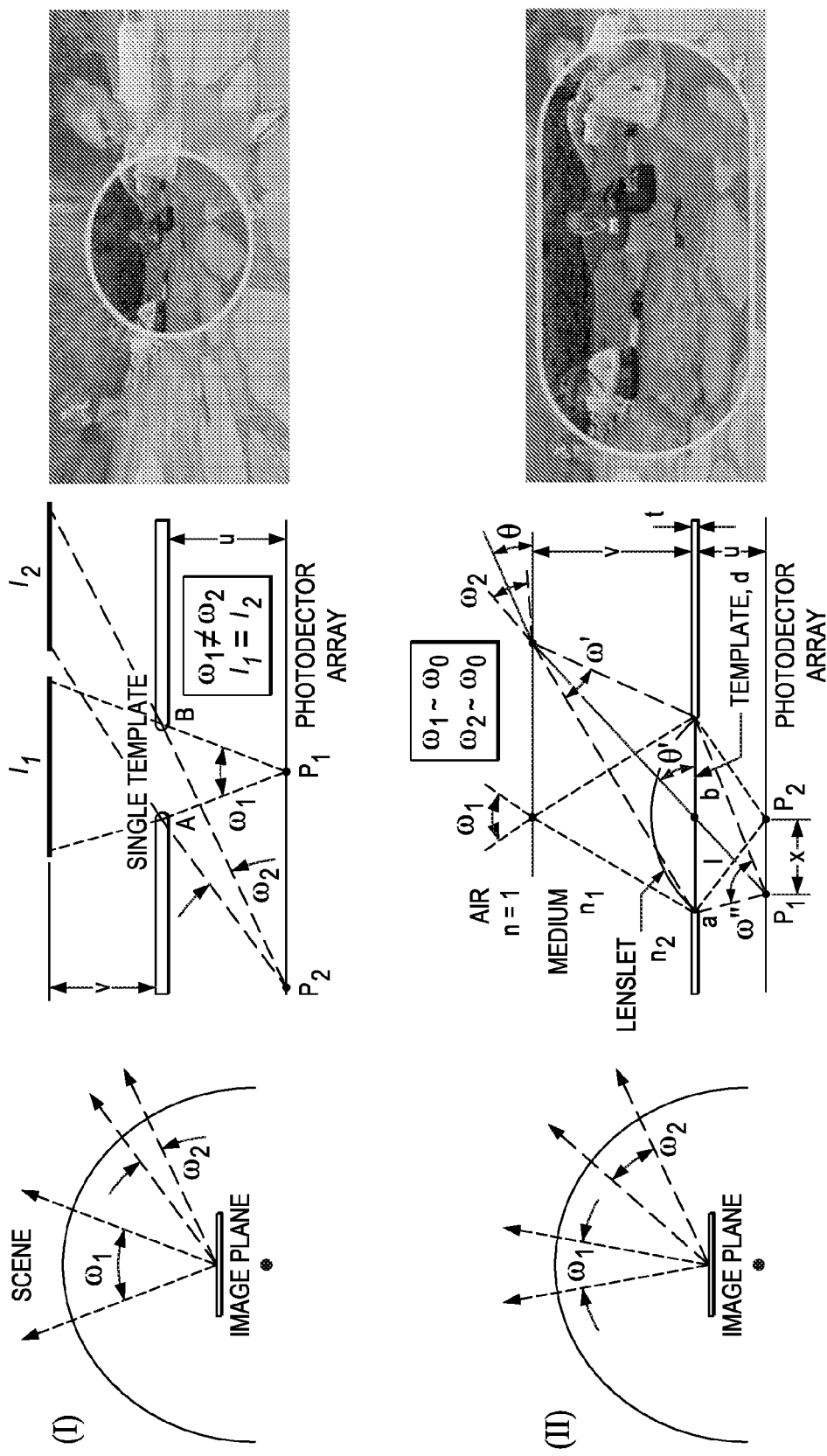

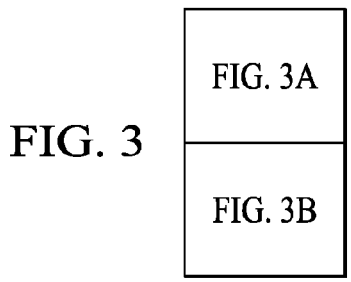
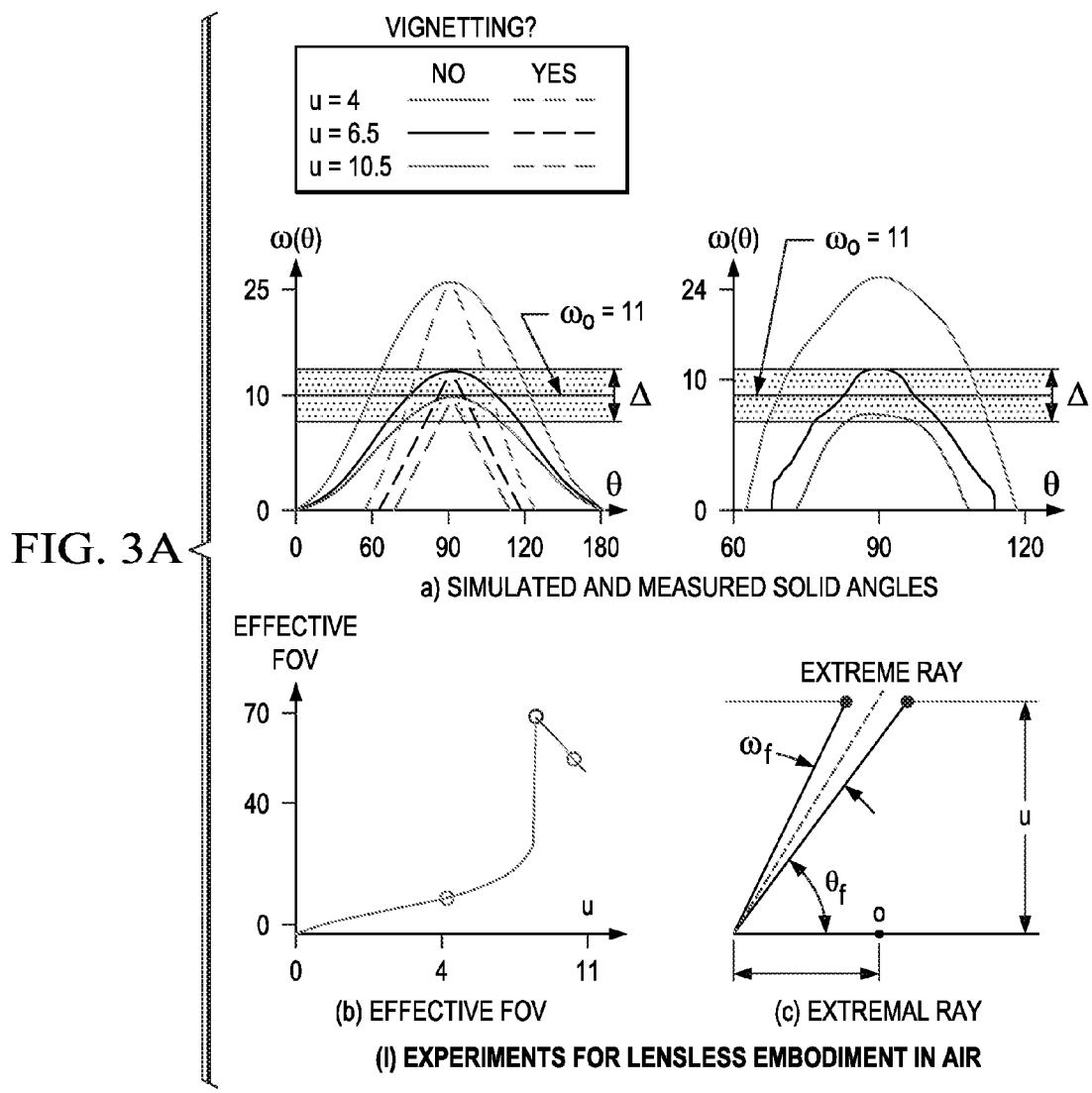

FIG. 4
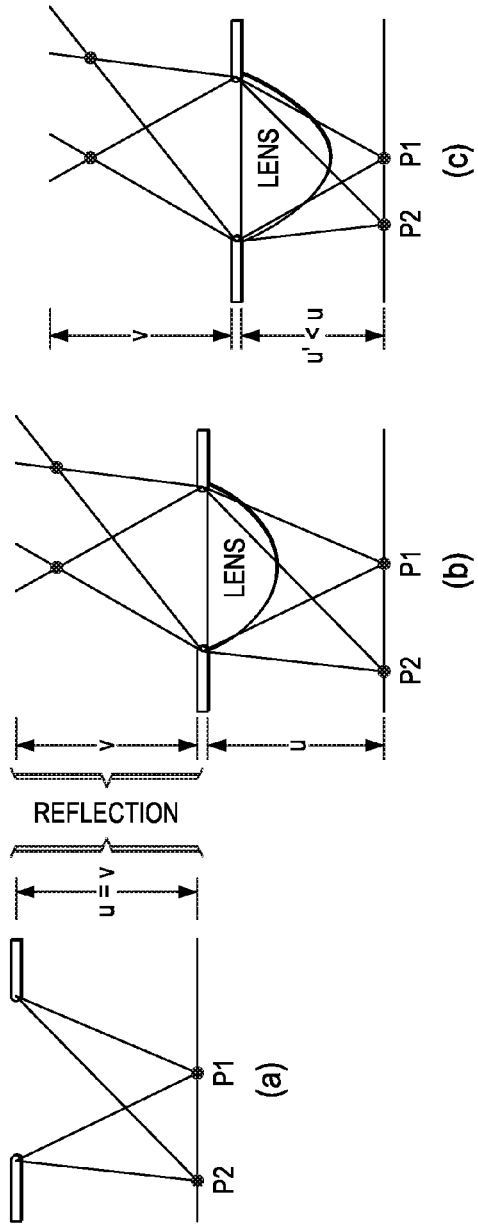
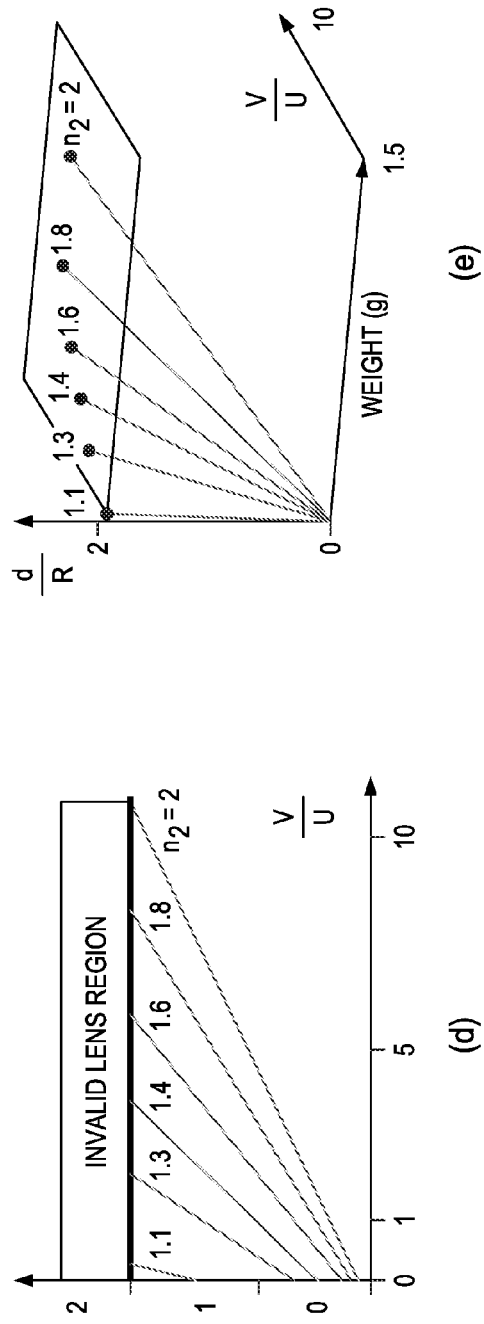

OPTICAL MICRO-SENSOR

RELATED APPLICATION

This patent application claims priority to U.S. Provisional Patent Application No. 61/321,481, filed on Apr. 6, 2010, titled "Optical Micro-Sensor," which is assigned to the assignee of the currently claimed subject matter. The foregoing provisional patent application is herein incorporated by reference in its entirety.

GOVERNMENT LICENSE RIGHTS

This invention was made with government support under N00014-09-1-1022 awarded by the U.S. Office of Naval Research and under W911NF-08-1-0516 awarded by the U.S. Department of Defense, U.S. Army Research Office. The government has certain rights in this invention.

FIELD

The present disclosure is related to small optical sensors, such as sensors comprising optical elements and photo-sensitive elements at or around a milli-scale or micro-scale size.

BACKGROUND

Recent availability of portable camera-equipped computers, such as smart-phones, has created interest in computer vision tools, including ones that are able to operate within limited power or mass budgets. A class of smaller platforms is also available. These include micro-platforms having size less than about 1 micron. Power or mass for these devices may make standard computations (e.g., matrix inversion, convolution, etc.) a challenge. A desire exists to have an ability to perform operations in a manner to stay within a specified power or mass budget, such as micro-level or smaller, for example.

BRIEF DESCRIPTION OF THE DRAWINGS

Non-limiting or non-exhaustive embodiments will be described with reference to the following figures, wherein like reference numerals refer to like parts throughout the various figures unless otherwise specified.

FIG. 1 includes schematic diagrams illustrating embodiments of a planar sensor array;

FIG. 2 includes diagrams illustrating employing optical template filtering for an embodiment:

FIG. 4 are plots illustrating graphically features or aspects of various embodiment array assemblies;

DETAILED DESCRIPTION

Figure 3B:
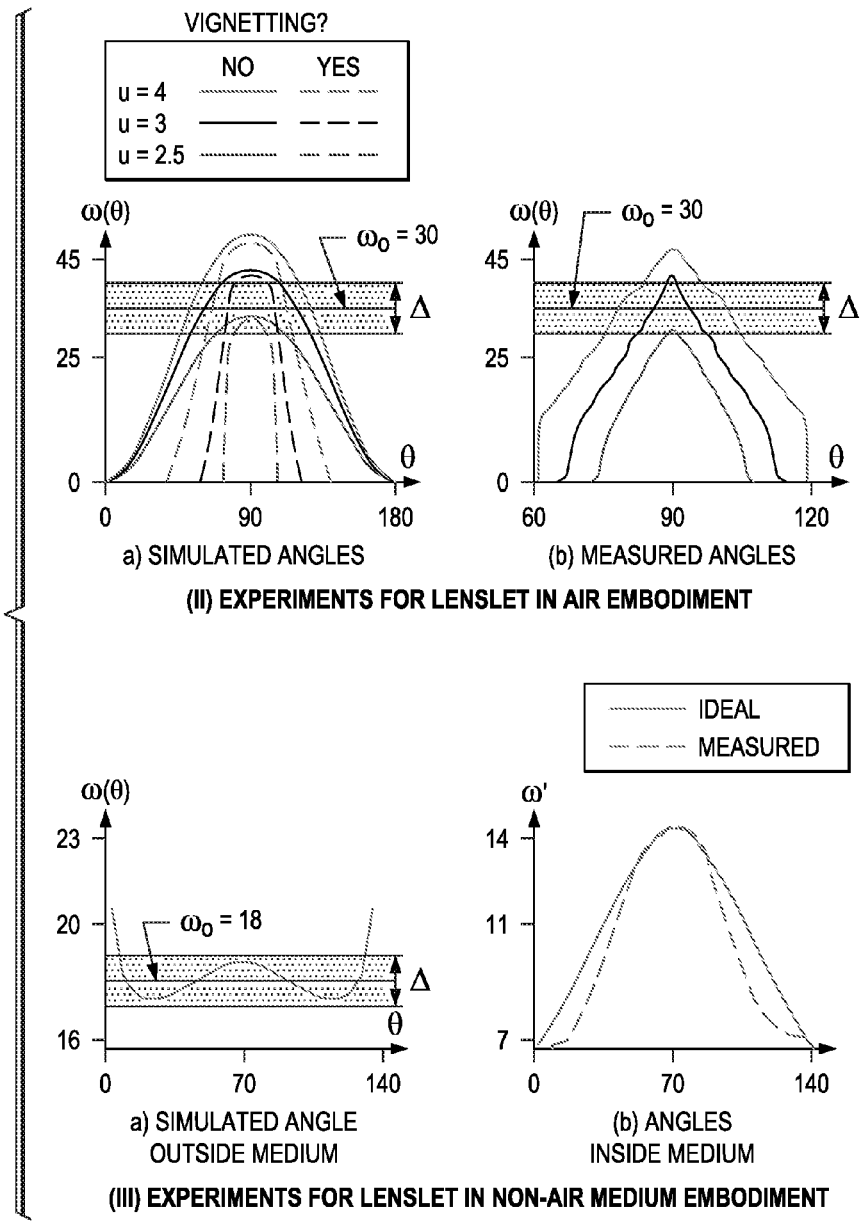
FIG. 3 are a series of diagrams illustrating measured and simulated optical parameters for three embodiments employing different photo detector distances.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that may be known by one of ordinary skill have not been described in detail so as not to obscure claimed subject matter.

Reference throughout this specification to "one embodiment" or "an embodiment" means that a particular feature, structure, or characteristic described in connection with an embodiment is included in at least one embodiment of claimed subject matter. Thus, appearances of the phrase "in one embodiment" or "an embodiment" in various places throughout this specification are not necessarily all referring to the same embodiment. Furthermore, particular features, structures, or characteristics may be combined in one or more embodiments.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer or electronic computing device, such as a processor, after it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, quantities may take the form of electrical or magnetic signals capable of being stored, transferred, combined, compared or otherwise manipulated. It has proven convenient at times, principally for reasons of common usage, to refer to signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of a special purpose computer or similar special purpose electronic computing device.

Image filtering may be employed in connection with vision techniques, including, for example, feature extraction or object detection; however, relatively speaking, computational cost may be high. A desire exists to have an ability to perform filtering operations or the like employing a micro-device in a manner to stay at least approximately within a specified power or mass budget, for example. In at least one embodiment of a micro device, replacing a conventional general-purpose camera and processor with a simpler or smaller device that succeeds at a particular task while being low powered or less expensive may permit tradeoffs between field of view, volume, mass or power consumption. Examples of specific tasks may include locating edges, tracking targets or detecting faces, although claimed subject matter is not limited in scope in this respect.

In at least one embodiment, a vision sensor may include a sensor assembly. The sensor assembly may include: a lens embedded in a refractive slab; an attenuating template; and an image sensor, such as a photo detector. For example, the index of refraction of the refractive slab may be higher than the index of refraction of the ambient environment to permit a wider effective field of view than might otherwise be present. A template may be located immediate adjacent to the lens so that light striking the image sensor passes through the refractive slab, the lens, and the template. Therefore, optical convolution may be implemented as a result of selection or arrangement of the slab, lens and template. For example, Zomet, A., Nayar, S.: Lensless imaging with a controllable aperture, appearing in CVPR (2006), considers optical convolution of a planar scene without the use of a lens or refractive slab. In at least one embodiment, optical convolution can be performed with fidelity on the sphere of directions, allowing a wide effective field of view, by appropriate selection or arrangement of, for example: a template and image sensor; a template, lens, and image sensor; a template, refractive slab, and image sensor; or a template, lens, refractive slab and image sensor. Of course, claimed subject matter is not limited in scope to any particular embodiment. Rather, the foregoing is merely intended to be illustrative.

For particular embodiments in accordance with claimed subject matter, benefits may emerge as a result of shrinking a vision system to micro-scale. Improved power consumption or utilization may, for example, be desirable. This may be accomplished by limiting computational burden. Likewise, lower volume or mass constraints may be desirable. Although claimed subject matter is not limited in scope in this respect, benefits, such as these, may be addressed or realized in connection with one or more particular embodiments, as described in more detail below.

Systems may be constructed from arrays of sensing elements, such as array 110, as depicted in FIG. 1, for example. For a task-specific wide-angle sensor, arrays of sensing elements may handle a specific task. In the expanded view of a single sensor 105 in FIG. 1, rays may graze a medium denser than air and may be refracted by a critical angle. FIG. 1 shows, for example, an example sensor embodiment 105 illustrating a photo detector plane 135, a template 125, and a lenslet 115. An array, such as 110, for example, in the medium may obtain a full 180 degree field-of-view, as illustrated. Templates in the optical path, such as 125, for example, may support tasks, such as locating edges, tracking targets or detecting faces. Of course, this is merely an example embodiment and claimed subject matter is not limited in scope to this example.

A sensor may contain an optical configuration to exploit Snell's law and thereby obtain a larger field of view while potentially reducing volume, mass, or power, for example. An element, in one example embodiment or implementation, may embed an attenuating template to extend optical filtering mechanisms to a wider field. A sensor array equipped with appropriate templates may perform a variety of filter-based vision tasks, including, for example, edge detection, tracking, or Viola-Jones-style detection. System embodiments may, therefore, be more efficient through filtering in the optical domain. A description or formalization of trade-offs between field of view, convolution accuracy, volume, mass, or power for a variety of optical configurations, including lensless apertures, lenslets, or refracting slabs, may be realized through various embodiments in accordance with claimed subject matter. A set of parameters may, for example, be utilized in a manner to result in a device configuration which may widen field of view while reducing sensor size or power. Various example embodiments of milli- or micro-scale devices are possible, for example, to perform edge detection, target tracking, or face detection.

An embodiment of a micro-device in accordance with claimed subject matter may filter over a large field of view using relatively few pixels, limited processing power, and no separate image storage, although claimed subject matter is not limited in scope to any particular embodiment. For example, convolution may be performed in an optical domain. Computational burden of filtering may be reduced as a result. In at least one embodiment, for example, an attenuating template may be placed in an imaging path to achieve convolution, such as before light strikes a photo-detector array, as described in more detail later. A variety of optical configurations may be employed, including: a template; a template with a lenslet; a template in a refracting slab; or any combinations thereof, as previously mentioned. For example, in one embodiment, a wide field-of-view milli- or micro-scale target detector may comprise a sensor with a few thousand pixels and a low-power micro-controller.

Optical convolution may be applied through a variety of optical configurations, for example. Optical convolution has been used as an alternative to electronic processing after image capture, such as with coherent light. Zomet, A., Nayar, S.: Lensless imaging with a controllable aperture, appearing in CVPR (2006), considers optical convolution of incoherent light from a planar scene. In at least one embodiment, a camera with a processor may be realized as a miniature device that is able to perform a particular filtering task while being compact, relatively low powered, and/or relatively low cost. An embodiment employing a static template is discussed below, although variable templates may likewise be applied if available at a desired scale. In effect, controlled image blur may be applied. In at least one embodiment, optical convolution may be achieved as a blur with a point-spread function given by a template. A Snell's window effect, induced by refractive slabs, may also be utilized in a classical "water pinhole camera," although for a much smaller size device in the embodiment described.

Wide-angle imaging may be achieved with a variety of reflective or refractive optical elements. Embodiments in accordance with claimed subject matter may include lenslets or refractive slabs, although claimed subject matter is not limited to these examples of optics or optical elements. Other optical elements for small form factors may likewise be employed. In at least one embodiment, as alluded to previously, Snell's window effect may be induced. In at least one embodiment, this may be accomplished with a refractive slab, although, again, claimed subject matter is not limited in scope in this respect. In at least one embodiment, a lens in a refractive slab of a higher refractive index than surrounding material may be employed to produce a larger field of view.

A small sensor with a fixed template may be employed to filter a visual field to detect an object over a wide range of directions (e.g., a large field of view). For a micro-sized sensor, such as array 110, a scene may be considered distant, as shown, for example, in FIG. 1, and a local plenoptic function may be considered to effectively comprise a constant function of spatial position, but may vary with angle. Spherical convolution, meaning convolution defined on a sphere of directions, as suggested previously, may be applied in an example embodiment, for example, to accomplish detection with fidelity over a wide field of view.

In conventional two-dimensional image filtering, a template typically has a fixed spatial extent while it convolves with an image. Similarly, in ideal spherical convolution, a solid angle of a desired spherical template is constant, say $\omega_o$. However, planar templates or flat photo-detectors may result in a measured solid angle varying, as shown for two instances in FIG. 2. One could build curved photo sensors. However, in an alternate approach, one may approximate spherical convolution using planar components to increase an effective field-of-view (eFOV) of a sensor, e.g., a viewing range over which measured solid angles are close to $\omega_o$.

In FIG. 2(I), eFOV is low; measured solid angles may vary for different points on a photo-detector plane. From similar triangles, $$l_1 = l_2 = \|AB\|\frac{(v+u)}{u},$$

implying that a sensor convolves a stretched version of a template with an assumed planar scene at a distance (v+u) from the sensor. For distant scenes, this may be viewed as equivalent to a perspective projection onto a plane followed by filtering. Since a scene is actually non-planar, distortions may occur. A few photo-detectors may measure solid angles close to $\omega_o$, resulting in low eFOV, as shown in FIG. 2(I).

However, as shown in FIG. 2(II), a wide eFOV may be enabled if measured solid angles are near-constant over a wide angular range. A potential embodiment, different from typical micro-lens arrays, may use a plano-convex lens over an attenuating template embedded in a medium of lower refractive index. For clarity, a flatland figure is discussed below; however, optics are radially symmetric. Therefore, embodiments may be applied to address three dimensional situations, as desired. A photo-detector distance u may be greater than the focal length, allowing a solid angle $\omega$ to collect light from different distant scene points. With small sensors, a vignetting effect from t, the aperture thickness, may also be considered, as discussed in more detail later. Note that height of an embedding medium is set to v, which comprises the plane of focus for the lenslet in this example. This is possible without significant loss of generality since a scene may be considered distant.

Embodiments include a lensless template (n1=n2=1), a template embedded in a refractive slab (n1=n2>1), a template with a micro-lens (n1=1; n2>n1), or a template with a lens and embedding slab (n2>n1>1). Although claimed subject matter is not limited in scope to these examples, they may be readily micro-fabricated. Other alternative embodiments are mentioned below.

For elements shown in FIG. 2(II), for example, tradeoffs between effective field of view and volume or mass may be determined. This may be demonstrated for a single sensing element with the understanding that for practical applications, a sensor may be assembled by tiling elements, such as array 110. Templates are also treated as monochromatic in an example embodiment, but spectral filters, with transmittance over ultra-violet wavelengths of light, visible wavelengths of light, infrared wavelengths of light, or combinations thereof may be employed to enhance performance, as discussed below, for example.

A single sensor configuration may be described in terms of a five dimensional vector $\pi=(u, d, n1, n2, R)$, where u comprises template photo sensor distance, d comprises template size, n1 comprises refractive index for a medium, n2 comprises refractive index for a lenslet, and R comprises radius of curvature. Choosing or selecting parameters may in effect determine a solid angle, $\omega$, measured in view directions $\theta$, represented as a scalar function, $\omega(\theta; \pi)$, which may be shortened to $\omega(\theta)$ or $\omega(x)$ via a one-to-one mapping between viewing angle and photo detector coordinates.

Effective field of view (eFOV) comprises a set of view directions for which a measured solid angle is sufficiently close to a constant, desired solid angle $\omega o$. Formally, this may be written as $|\Theta|$ with $\Theta=\{\theta: F(\omega(\theta; \Pi), \omega_o) \leq \Delta\}$ where $\Delta$ comprises a user-defined threshold, and $F(\omega(\theta; \Pi), \omega_o)$ comprises a chosen distance metric. Let $\Theta$ include the optical axis (e.g., $\theta=90$ degrees), to make use of photo-detectors, as fully as is reasonable. For convenience, an L2 distance metric may be employed so that $F(\omega, \omega_o) = \|\omega - \omega_o\|_2$. Note that a set of permissible view directions is contained in an upper hemisphere; $\theta \in (0, \pi)$.

A particular filtering operator, which may be optically defined by $(\omega_o, \Delta, F)$, may be implemented via a series of relevant considerations. In an embodiment, this may be achieved by a family of parameters $\pi$ for realizable configuration from which a desirable configuration may be selected. Of course, depending at least in part on the application and the platform, desirable configurations may include a "minimum" feasible volume or mass (or both), or a "maximum" feasible and possible eFOV or perhaps a "maximum" feasible and possible eFOV given particular size constraints, as examples. Deriving relationships and verifying results with empirical analysis, in the form of a look-up table, for example, may provide an approach to implementing possible configurations, as is demonstrated below. Several considerations, however, may affect selecting parameters, including the following:

$\pi$ should be physically plausible, with u, d, R>=0, n1, n2>=1; d=<2R (from the lens equation) and n1>=n2 (to create a convex lens);

$\pi$ should be capable of feasibly being micro-fabricated.

Furthermore, in practice, diffraction limits are not typically reached. Instead, other considerations emerge and drive possible limits, such as these examples for particular embodiments: a "minimum" template size dmin for which a template printing process may still provide desired angular resolution; a "maximum" photo-detector length Emax; and t, aperture thickness, whose effect is explained in more detail below.

For example, for a lensless version or embodiment, as in FIG. 2(II), where $\omega''=\omega'=\omega$ (the subscript from $\omega 2$ is omitted) and n2=n1=1. In this example, parameter space may be two-dimensional, $\pi=(u, d)$. FIG. 3(I) shows example angular support diagrams for a fixed d=0.1 mm and three different values of u=(4; 6.5; 10.5). Shifting a template by different photo-detector distances u appears to move a corresponding $\omega(\theta)$ curve through an interval $\Delta$, around a desired solid angle $\omega o$. A plot of eFOV varying with u in FIG. 3 I(b) illustrates a peak, suggesting a possibility of an eFOV configuration exceeding other eFOVs if d is fixed.

Since template mass is near-zero, an approach to resolving a configuration of a desirable lensless embodiment, using eFOV and volume and applying three operations, is illustrated, although claimed subject matter is not limited in scope in this respect. Operations may include: selecting a value for d; determining a u such that a (u; d) pair has a desired eFOV; and, globally scaling a configuration until a constraint in $\Psi$ is encountered. In an illustrated example, a constraint dmin is assumed, but a similar approach may be extended to $\Psi$.

Recall that eFOV depends at least in part on angles, which remain essentially unchanged with global linear scaling of lengths or distances, as shown in FIG. 2 (II), for example. There exists at least a one-dimensional family of lensless configurations, $\pi_k=(ku, kd)$ parameterized by scale factor k, which have essentially identical eFOV. However, this is uniquely one family. For example, to illustrate this, suppose there were to exist another family $\pi'=(u', d')$ outside the family parameterized by scale k, but with essentially identical eFOV. Consider a value of $k=u'/u$ such that $\pi_k$ and $\pi'$ employ essentially the same photo-detector distance u, but different template sizes such that $$d \neq \frac{u'}{u}d'.$$

However, also consider an extreme viewing angle $\theta f$ (see, for example, FIG. 3 I(c)) of $\pi'$. This corresponds to a viewing angle of a final photo detector element xf within eFOV, which integrates a solid angle. $\omega_f=\Delta+\omega_o$. An expression for any solid angle is $$\omega = \arccos\left(\frac{2u^2 + 2x^2 - \frac{d^2}{2}}{2\sqrt{\left(u^2 + \left(\frac{d}{2}-x\right)^2\right)*\left(u^2 + \left(\frac{d}{2}+x\right)^2\right)}}\right)$$

from right-angled and cosine theorems for triangles in FIG. 2 (II). This, however, would imply templates of different sizes from the same height u at the same coordinate xf subtend different angles, which is a geometric contradiction. Therefore, it is established the solid angle at xf would be in the family.

Implementing an embodiment described previously, for a first operation, select a positive value for d. To implement a second operation, for a family of configurations, a desired value of u to be found should correspond to an eFOV exceeding the others. Intuitively, this eFOV may occur as illustrated by the curve in FIG. 3 I(a) grazing a $\Delta$ threshold edge. A brute force search for u may therefore be applied; however, empirical evidence indicates a convex surface or curve (see FIG. 3 I(b)), which may permit application of gradient-based methods, for example, in an embodiment. To implement a third operation, if k<1, $\pi_k$ has a lower volume than $\pi$. After identifying a candidate, therefore, it may be scaled downwards to obtain a k such that further reduction would violate a limit on d (e.g., referred to previously as "dmin").

For a lenslet in air, $\omega''=\omega'\neq\omega$ and $n2>n1=1$. Therefore, an optical parameter space appears to be four-dimensional, $\pi=(u, d, n2, R)$. A two operation approach or method may therefore be employed. First, find a desired lensless configuration $\pi_1=(u_1, d_1)$ and, second, operationally trade-off volume and weight for a desired configuration using lenslet parameters (n2; R).

FIG. 4 (a-b) demonstrates that for any lenslet (b), there exists a lensless ray geometry (a) of essentially identical eFOV. This may be seen from ray geometry in (a) which is essentially the same (under a mirror reflection) to exterior, unrefracted rays in (b). FIG. 3(II) shows simulated and measured angles for a 2 mm lenslet at different values of u, which shift $\omega(\theta)$ around $\omega o$, similar to a lensless embodiment, as previously described. Therefore to determine an eFOV lenslet configuration, a first operation may be performed to find $\pi_1$, as done in a lensless embodiment or configuration, as previously described. If $\pi$ is specified, for example, where $d=d_1$, $n_1$ comprises a selected valid refractive index, u may comprise a selected positive value, and $$R = \frac{(n_2 - 1)uv}{u + v}$$

where $v=u_f$. In a second operation, $\pi$ may be modified according to a two-dimensional volume-weight tradeoff by increasing n2 or decreasing R, as illustrated in FIG. 4 for the case of $\omega o=16$ degrees, for example. Note that reducing R counter intuitively increases lens bulge. A downward orientation of a lens in FIG. 4(b-c) may allow decreasing u without adding significant volume to a configuration, if we assume n2=<2 and so R=<f<u.

Increasing n2 or decreasing R may make a heavier configuration but may enable a shorter focal length, allowing essentially the same eFOV but with a smaller assembly. Lines in FIG. 4(d) illustrate possible improvements in volume which may be provided by different refractive indices. Excellent compression may therefore be achieved where the lines intersect a constraint of d=<2R in $\Psi$. However, as FIG. 4(e) shows, this results in increased weight, implying a particular configuration may comprise a design choice.

Measured solid angles for a lenslet embedded in a medium enables wide-FOV filtering. FIG. 3 III(a) shows an example of a Snell's window effect on an external solid angle, $\omega$, which curves back to a desired solid angle, $\omega o$, for points on a photo detector that view a scene obliquely. This may allow a solid angle to be closer to $\omega o$ longer in comparison with non-Snell window gaussian-like tails, as shown in FIG. 3 (I) and (II), for example.

Figure 5:
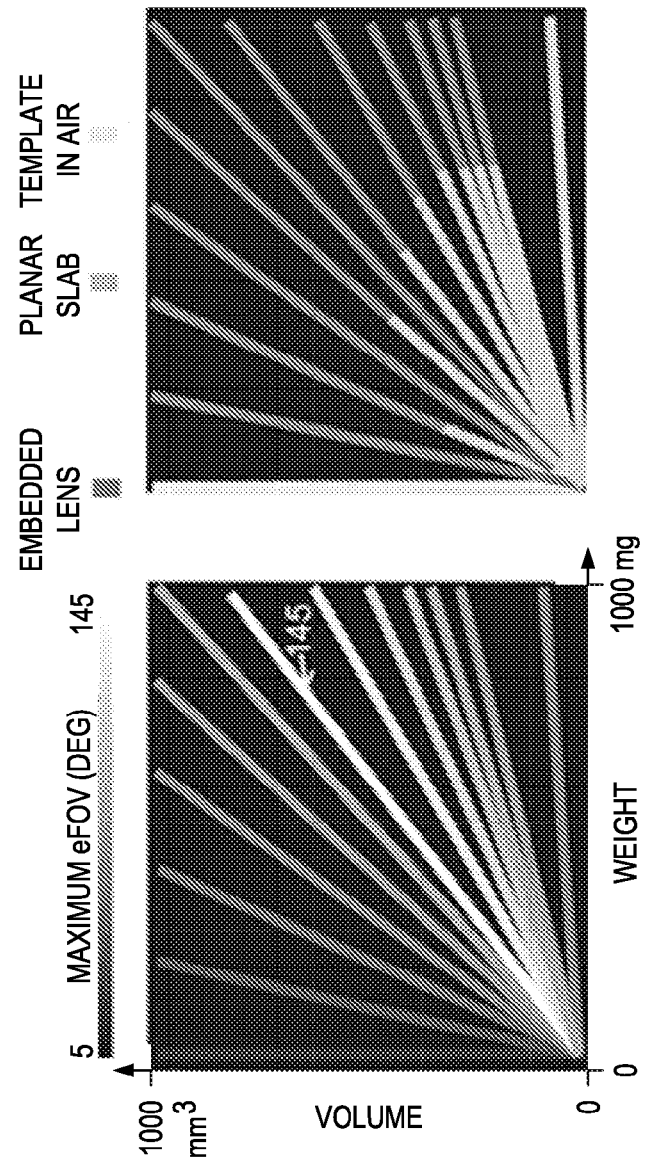
FIG. 5 are diagrams illustrating look up tables for array assembly embodiments.

Using look up tables, an empirical overview to a parameter space of a Snell's window lenslet embodiment with $\pi=(u, d, n1, n2, R)$ is provided. A look-up table may be constructed in a manner to constrain or specify any of a desired weight, volume or eFOV characteristics, for example. Employing small sensor sizes, reasonable ranges for values of u, d and/or R may be selected or employed. For $\pi$ in a parameterized space, in a brute force manner, eFOV may be determined, taking into account a change in embedded lens focal length. A sensor volume for a given $\pi$ may be determined in accordance with $V=2xfu$, while its weight may be computed as $W=V_l\rho_2+(V-V_l)\rho_1$, where $V_l$ comprises volume of a lenslet, computed as a spherical cap, and $\rho1$ and $\rho2$ comprise densities of refractive indices n1 and n2, applying a linear relation between optical and physical densities. FIG. 5 visualizes a lookup table for $\omega o=12$ degrees and $\Delta=2.4$ degrees by projecting it onto a (volume, weight) plane. A point in the plane shows a largest eFOV of sampled $\pi_s$ at that point. In addition, on the right in the figure, hatching in the figure differentiates different approaches. From the figure, points with essentially the same eFOV occur on lines, and are one-dimensional. Given any $\pi$, a family of configurations with equivalent eFOV may be determined through $\pi_k=(ku, kd, n1, n2, kR)$. However, different optical configuration approaches are depicted on the right. Several lines with higher eFOV slope toward higher weight, implying refractive optics are used. A lensless configuration, for example, may be more useful if nearly zero or essentially no weight is desired. A performance dominating approach is not apparent. For example, desirable eFOV for 145 degrees comprises a central line, which is not low in volume or in weight.

Figure 6:
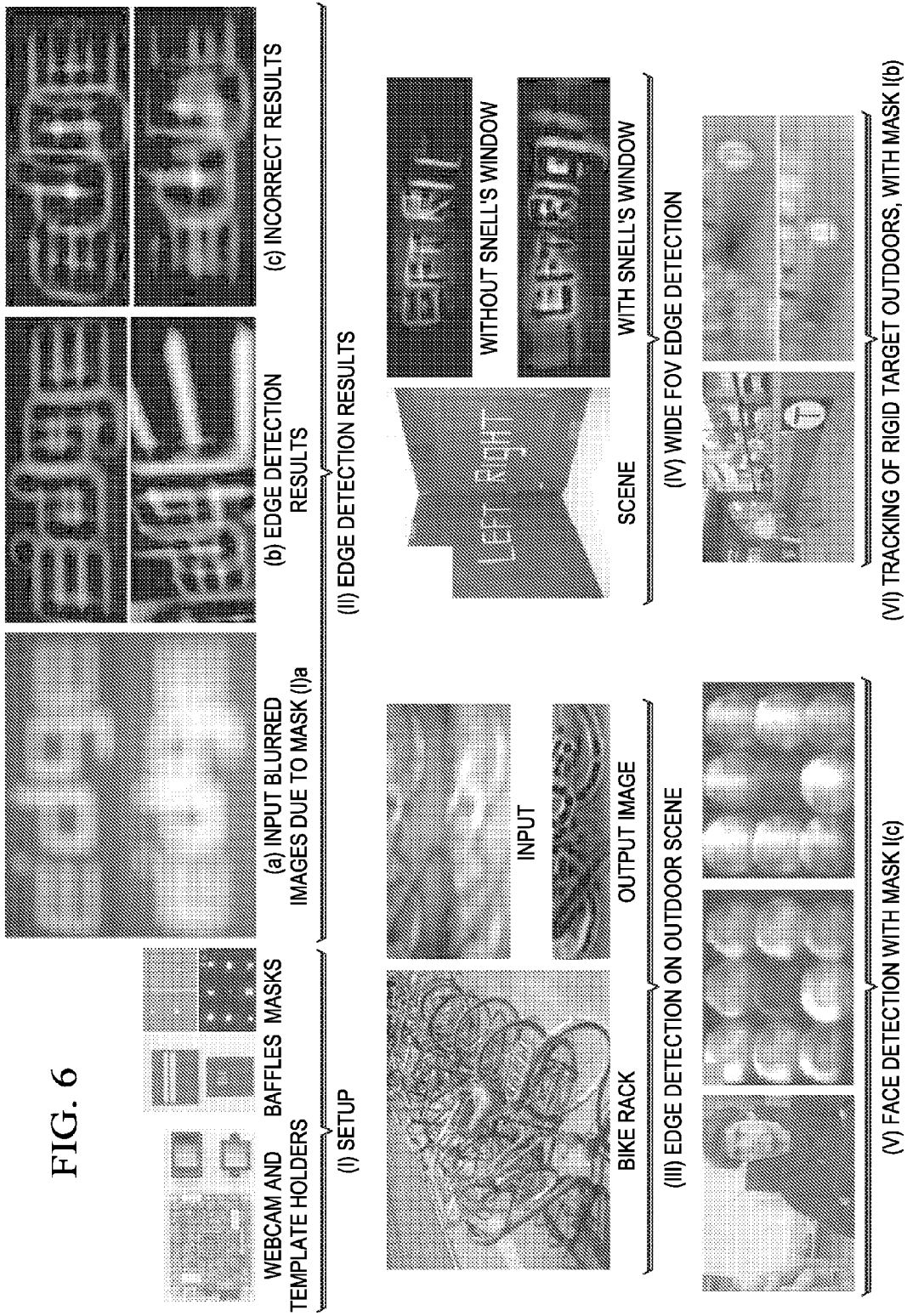
FIG. 6 are images of example embodiments.

An ability to provide a wide eFOV for optical convolution permits miniaturization using template-based vision techniques. In FIG. 6 (I) an example embodiment is illustrated, which comprises a camera (Lu-171, Lumenera Inc.) with custom 3D printed template assembly. Binary templates are cut into black card paper using a 100-micron laser (VLS3.50, Versa Inc.) or grayscale patterns are printed on photographic film (PageWorks Inc., http://www.pageworks.com/). A camera photo detector plane is divided into multiple single-template sensor elements using opaque baffles created from layered paper to reduce cross-talk between sensor elements. Snell's window is achieved by attaching laser-cut pieces of acrylic (n1=1:5) to the templates. UV cured optical glue of a corresponding refractive index was used to bind these and fill air gaps in templates.

Figure 7:
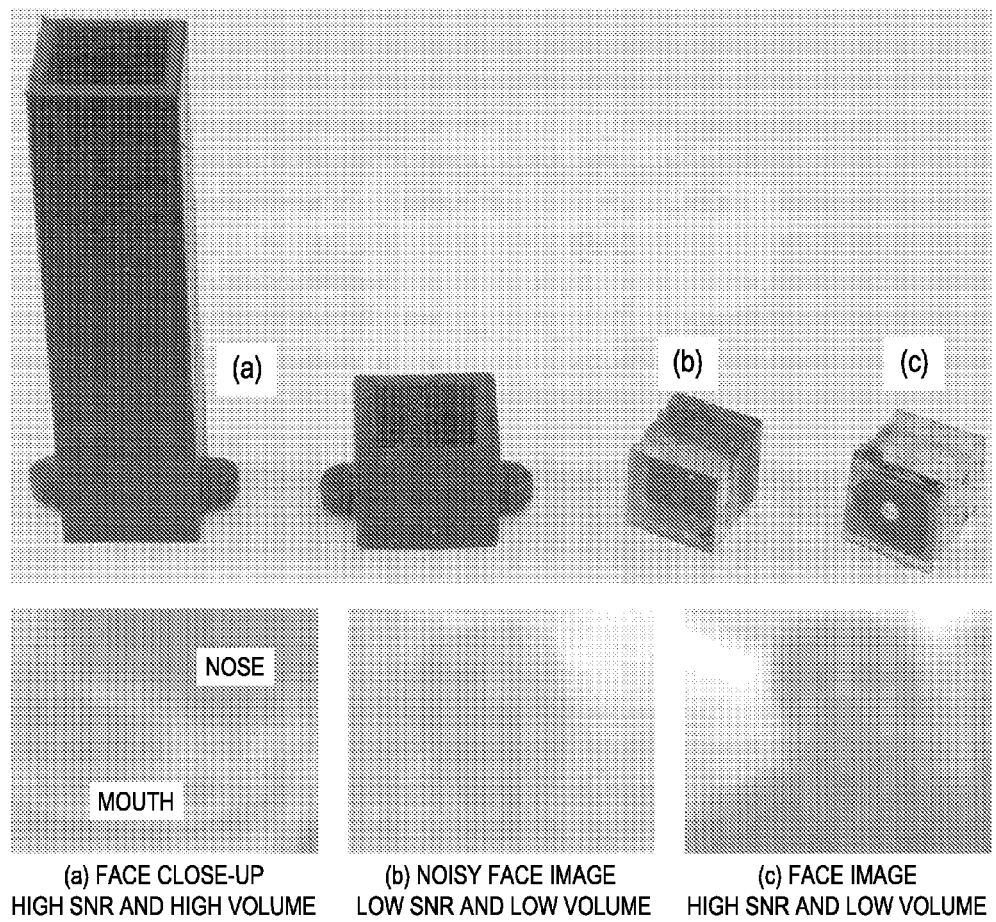
FIG. 7 are images showing three embodiments and corresponding sample output images respectively produced by the embodiments.
Figure 8:
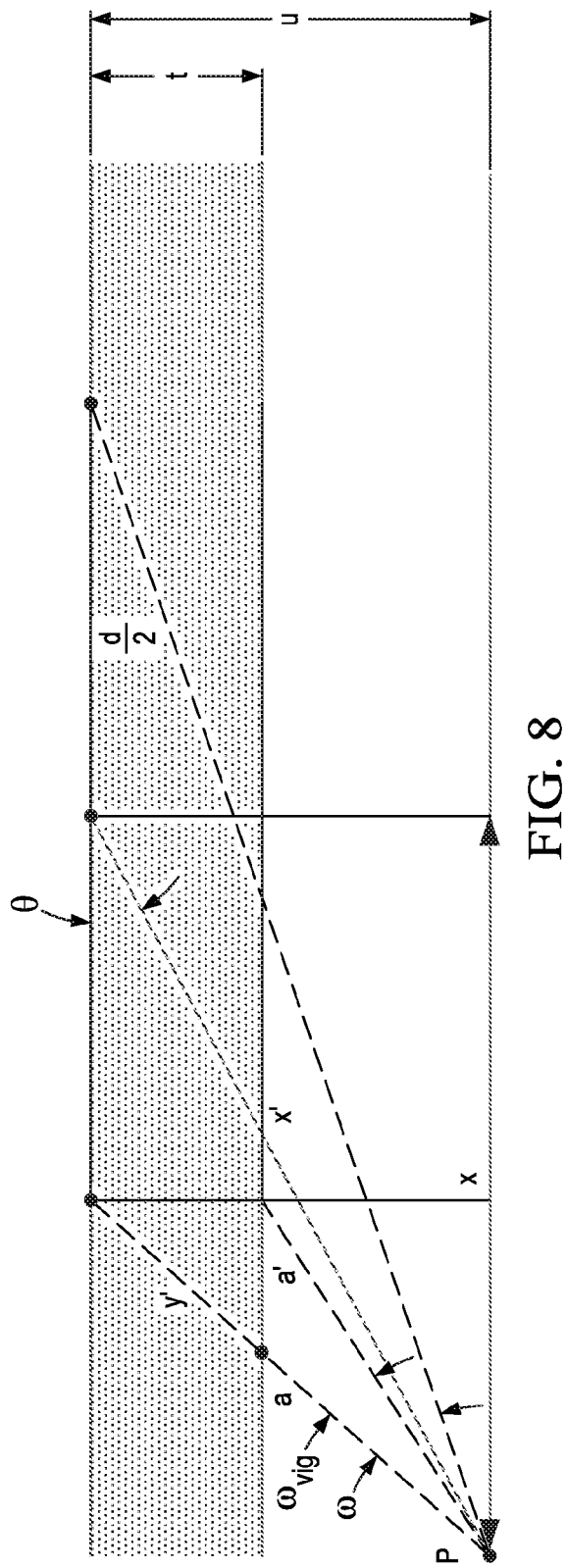
FIG. 8 is a schematic diagram illustrating vignetting effects from aperture thickness which may occur in an embodiment.

Some experimental validation was achieved. For example, various possible configurations may exist with essentially the same eFOV, while differing in volume, mass or other characteristics. To illustrate, FIG. 7(I) shows three sensor measurements of a face. The first is taken with a lensless configuration with a large sensor/template distance (d=2:5 mm, u=70 mm), the second with a reduced template size, (d=0:1 mm, u=2:8 mm) and the third with an embedded lenslet configuration, (d=2:5 mm, R=2:12 mm, n2=1.85, n1=1.5, u=12 mm). A lens may collect more light—and hence the third measurement illustrates better SNR than the second. A more subtle issue is that volume of the second sensor is smaller than the first, while measurement quality appears generally similar.

A classical approach to edge detection at a particular scale is to convolve an image with a Laplacian of a Gaussian filter. This may be approximated by a difference-of-Gaussians, which may be accomplished by convolving a scene with two Gaussian filters in the optical domain. A sensor may obtain two differently blurred scene measurements, and compute an edge map by subtracting corresponding pixels. While computational savings of this approach are negligible if computing fine scale edges (e.g., low width Gaussians), savings increase as desired edges become more coarse, or if elements are tiled for multi-scale edge detection.

FIG. 6(II) demonstrates using two disk-shaped binary templates of different radii instead of two Gaussians. Like a difference-of-Gaussian operator, differences between corresponding pixels in two sensor elements produces a band limited view of a scene (e.g., an edge map). A lensless configuration with two templates at essentially the same photo detector distance is applied to implement or realize an operator, (d=0:1 mm; u=3:7 mm) and (d=0:2 mm; u=3:7 mm) with an eFOV of 90 degrees. The figure shows edges of a simple scene with printed words. A naive use of sensors with u values of 2 mm and 5 mm produces incorrect results. However, FIG. 6(III) shows results with an outdoor scene of a bike stand, demonstrating robustness, while FIG. 6(IV) shows a V-shaped scene viewed by a simple pinhole and by a wide-FOV Snell's window enhanced sensor, which is able to detect more letters.

Face detection in a traditional post-capture processing sense may be formulated as a process in which: 1) an image is convolved with a series of templates, and 2) template-responses at a pixel are used as signal inputs to a binary classifier. In comparison to existing approaches, performing a filtering operation optically reduces computational cost and employing templates with arbitrary spatial patterns and spectral selectivity potentially reduces the number of templates that might otherwise be necessary for high or acceptable detection rates.

Spatio-spectral templates may be applied to discriminate between faces and background.

Alternatively, however, in FIG. 6(V), in an embodiment, nine binary templates are employed. The templates are measured in FIG. 6 I(c). These are arranged in a lensless configuration (d=0:2 mm; u=5:2 mm), in which a 20 degree eFOV is contemplated. The detector evaluates centers of the nine template responses and does not angularly localize a face. It produces a response using a linear classifier with no bias term.

Tracking, in its simplest form, may be implemented as sequential per-frame detection, and thus may be implemented optically using sensors as described above for face detection. If one can "afford" slightly more computation, however, classifiers used for detection may be combined with optical-flow-based tracking to improve performance. In either case, computational cost is reduced by performing optical filtering-for-matching.

In FIG. 6 (VI), a detector with two templates is illustrated, a "T" pattern (d=0:2 mm; u=3:7 mm) and a small circle (d=0:1 mm; u=3:7 mm), contemplated for a 90 degree eFOV. Given template responses, a nearest neighbor matching may be performed, culled by temporal information from a previous target location. Non-optical computation comprises a small number of subtractions and a minima calculation. Tracking for an outdoor scene, with obstacles over a whole field of view is accomplished.

Configurations within the scope of claimed subject matter would typically not be designed using commercial ray-tracing optimization tools, as these operate on focal planes, not solid angles. Additional embodiments may include artificial insect eyes if curved, miniaturized electronics is included. Embodiments within the scope of claimed subject matter may also be capable of employing templates built to exploit new scene information, such as, illumination outside the visible spectrum. Employing spectral filters has potential to enhance capacities of micro-vision devices with characteristics normally associated with conventional systems, such as lighting or scale invariance.

Aperture thickness may also be contemplated in a configuration within the scope of claimed subject matter, as mentioned previously. Total occlusion occurs if $$\arctan\left(\frac{t}{d}\right) = \arctan\left(\frac{u-t}{x-\frac{d}{2}}\right).$$

Elsewhere, the solid angle decreases by $$\omega_{vig} = \arccos\left(\frac{(y'+a)^2 + (a')^2 - (u-t)^2}{2(y'+a)(a')}\right)^{0.5} \text{ where}$$

$$y' = \left(\frac{\left(t\left(x-\frac{d}{2}\right)^2 + u^2 t^2\right)}{u^2}\right)^{0.5},$$

$$a = \left(\frac{\left(u^2(u-t)^2 + \left(\left(x-\frac{d}{2}\right)u^2 - t\left(x-\frac{d}{2}\right)\right)\right)^2}{u^2}\right)^{0.5} \text{ and}$$

$$a' = \frac{(4(u-t)^2 + (2x-d)^2)^{0.5}}{2}.$$

It will, of course, also be understood that, although particular embodiments have just been described, claimed subject matter is not limited in scope to a particular embodiment or implementation. For example, one embodiment may be in hardware, such as implemented on a device or combination of devices, as previously described, for example. Likewise, although claimed subject matter is not limited in scope in this respect, one embodiment may comprise one or more articles, such as a storage medium or storage media, for example, that may have stored thereon instructions executable by a specific or special purpose system or apparatus. As one potential example, a specific or special purpose computing platform may include one or more processing units or processors, one or more input/output devices, such as a display, a keyboard or a mouse, and one or more memories, such as static random access memory, dynamic random access memory, flash memory, or a hard drive, although, again, claimed subject matter is not limited in scope to this example.

In some circumstances, operation of a device, such as a change in state from a binary one to a binary zero or vice-versa, for example, may comprise a transformation, such as a physical transformation. With particular types of devices, such as a memory device, for example, such a physical transformation may comprise a physical transformation of an article to a different state or thing. For example, but without limitation, for some types of devices, a change in state may involve an accumulation and storage of charge or a release of stored charge. Likewise, in other devices, a change of state may comprise a physical change or transformation in magnetic orientation or a physical change or transformation in molecular structure, such as from crystalline to amorphous or vice-versa. In still other devices, a change in physical state may involve quantum mechanical phenomena, such as, superposition, entanglement, or the like, which may involve quantum bits (qubits), for example. The foregoing is not intended to be an exhaustive list of all examples in which a change in state for a binary one to a binary zero or vice-versa in a memory device may comprise a transformation, such as a physical transformation. Rather, the foregoing is intended to provide illustrative examples.

A computer-readable (storage) medium typically may be non-transitory or comprise a non-transitory device. In this context, a non-transitory storage medium may include a device that is tangible, meaning that the device has a concrete physical faint, although the device may change its physical state. Thus, for example, non-transitory refers to a device remaining tangible despite this change in state.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

Methodologies described herein may be implemented by various approaches depending, at least in part, on applications according to particular features or examples. For example, such methodologies may be implemented in hardware, firmware, or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices, other devices units designed to perform the functions described herein, or combinations thereof.

While there has been illustrated or described what are presently considered to be example features, it will be understood by those skilled in the art that various other modifications may be made, or equivalents may be substituted, without departing from claimed subject matter. Additionally, modifications may be made to adapt a particular situation to the teachings of claimed subject matter without departing from one or several central concepts described herein. Therefore, it is intended that claimed subject matter not be limited to the particular examples disclosed, but that such claimed subject matter may also include all aspects falling within the scope of appended claims, or equivalents thereof.

The invention claimed is:

1. An apparatus comprising:
an optical assembly comprising one or more optical elements and an optical path, said optical assembly capable of using an attenuating template in the optical path to perform optical spherical convolution comprising optical convolution on a sphere of directions by an arrangement of said one or more optical elements such that solid angles are near-constant over said sphere of directions.

2. The apparatus of claim 1, wherein said optical assembly forms a sensor assembly in conjunction with a photo detector array so that said sensor assembly is capable of performing optical spherical convolution before light strikes the photo detector assembly.

3. The apparatus of claim 2, wherein the optical assembly comprises one lens or less regardless of the number of photo detectors in said photo detector array.

4. The apparatus of claim 1, wherein said optical assembly comprises at least one of the following: a lensless assembly, a lenslet assembly, a refractive slab assembly, or any combination thereof.

5. The apparatus of claim 1, wherein said optical assembly comprises a component of an embedded system.

6. The apparatus of claim 5, wherein said embedded system includes a low power processor.

7. The apparatus of claim 1, wherein said optical assembly comprises on the order of a few thousand pixels or less.

8. The apparatus of claim 1, wherein said sensor assembly is capable of performing said optical spherical convolution without employing separate storage.

9. The apparatus of claim 8, wherein said sensor assembly is capable of performing said optical spherical convolution without employing separate storage within said sensor assembly.

10. The apparatus of claim 1, wherein said optical assembly is subject to a particular angular extent, error tolerance or angular resolution.

11. The apparatus of claim 1, wherein said optical assembly is capable of performing said optical spherical convolution using planar arrays of photo detectors to approximate said optical spherical convolution.

12. The apparatus of claim 1, wherein said attenuating template comprises a layered transparent print.

13. The apparatus of claim 1, wherein said attenuating template comprises a mask cut from an opaque material.

14. The apparatus of claim 1, wherein said attenuating template includes a spectral filter within at least one of the following light wavelength bands: ultra-violet, visible, infra-red, or any combination thereof.

15. The apparatus of claim 1, wherein said assembly employs an assembly configuration capable of implementing a Snell's window.

16. The apparatus of claim 1, wherein said arrangement of said one or more optical elements comprises selection of a template photo sensor distance, a template size, and a refractive index for a first medium.

17. The apparatus of claim 16, wherein said arrangement of said one or more optical elements further comprises a lenslet having a second refractive index and a radius of curvature.

18. A method comprising:
spherically convolving light using an attenuating template in the imaging path of a photo detector array assembly by an arrangement of one or more optical elements such that solid angles are near-constant over a sphere of directions.

19. The method of claim 18, wherein said spherically convolving light comprises spherically convolving light before said light strikes the photo detector array.

20. The method of claim 19, wherein said photo detector assembly is incorporated into a sensor assembly that comprises at least one of the following: a lensless assembly, a lenslet assembly, a refractive slab assembly, or any combination thereof.

21. The method of claim 19, wherein said photo detector array comprises on the order of a few thousand pixels or less.

22. The method of claim 19, wherein said spherically convolving light comprises spherically convolving light without employing separate storage.

23. The method of claim 19, wherein said spherically convolving light comprises spherically convolving light within said assembly.

24. The method of claim 19, wherein said spherically convolving light comprises spherically convolving light at a particular angular extent, error tolerance or angular resolution.

25. The method of claim 19, wherein said spherically convolving light comprises approximating said optical spherical convolution.

26. The method of claim 18, and further comprising: utilizing a Snell's window effect to improve effective field of view.

27. An apparatus comprising:
a micro-sized or smaller device, having a size less than about 1 micron, capable of at least approximating optical spherical convolution comprising optical convolution on a sphere of directions by an arrangement of one or more optical elements such that solid angles are near-constant over said sphere of directions;
said device having a configuration in which effective field of view is adjustable to improve power utilization or to reduce size.

28. The apparatus of claim 27, wherein said device has a configuration to implement a Snell's window.

29. The apparatus of claim 27, wherein said device is capable of at least one of the following: detecting faces, tracking targets, locating edges, or any combination thereof.

30. A sensor comprising:
a sensor assembly capable of performing optical spherical convolution comprising optical convolution on a sphere of directions by an arrangement of one or more optical elements such that solid angles are near-constant over said sphere of directions;
said sensor assembly including:
a detector array; and
a template;
wherein the detector array and the template have different effective indexes of refraction.

31. The sensor of claim 30, wherein the detector array and the template have respective refractive mediums.

32. The sensor of claim 31, wherein the refractive medium of the detector array comprises the ambient environment.

33. The sensor of claim 30, wherein the different indexes of refraction are associated with respective refractive mediums, the template including a first different refractive medium; and
the detector array including two different effective refractive mediums comprising a second different refractive medium and a third different refractive medium.

34. The sensor of claim 33, wherein the second different refractive medium comprises the ambient environment and the third different refractive medium comprises a layer of material disposed over or above the photo detector array.

35. The sensor of claim 34, wherein the third different refractive medium is shaped for a field of view that exceeds 150 degrees.

36. The sensor of claim 30, wherein the template comprises two or more sub-templates;
wherein the sensor assembly is capable of sensing respective sub-images associated with respective sub-templates.

37. The sensor of claim 36, and further comprising: a processor capable of generating an output image via optical convolution of respective kernels associated with respective sub-images.

* * * * *